United States Patent
Ganzer et al.

(10) Patent No.: US 7,040,786 B2
(45) Date of Patent: May 9, 2006

(54) ANTICOLLISION LIGHT FOR AIRCRAFT

(75) Inventors: Bernd Ganzer, Erwitte (DE); Rico Schulz, Rixbeck (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 0 days.

(21) Appl. No.: 10/677,259

(22) Filed: Oct. 3, 2003

(65) Prior Publication Data

US 2004/0130900 A1 Jul. 8, 2004

Related U.S. Application Data

(60) Provisional application No. 60/417,661, filed on Oct. 11, 2002.

(30) Foreign Application Priority Data

Oct. 4, 2002 (DE) ............... 102 46 335

(51) Int. Cl.
*B64D 47/02* (2006.01)
(52) U.S. Cl. ............ 362/470; 362/227; 362/244; 362/257; 362/308; 362/352
(58) Field of Classification Search ........... 362/470, 362/235, 227, 244, 249, 252, 257, 308, 311, 362/352, 800; 340/981, 815.45, 815.73, 340/815.76
See application file for complete search history.

(56) References Cited

U.S. PATENT DOCUMENTS

| 5,608,290 | A | 3/1997 | Hutchisson et al. |
| 6,244,728 | B1 | 6/2001 | Cote et al. |
| 6,456,205 | B1 * | 9/2002 | Russell et al. ......... 340/815.45 |
| 2002/0101189 | A1 | 8/2002 | Vo et al. |

FOREIGN PATENT DOCUMENTS

| EP | 1 231 109 A1 | 8/2002 |
| GB | 2 337 645 A | 11/1999 |
| JP | 2001-191901 A | 7/2001 |
| WO | WO 95/19525 A1 | 7/1995 |
| WO | WO 95/23313 A1 | 8/1995 |
| WO | WO 97/29320 A1 | 8/1997 |
| WO | WO 99/59869 A1 | 11/1999 |
| WO | WO 00/71417 A1 | 11/2000 |

* cited by examiner

*Primary Examiner*—Stephen Husar
*Assistant Examiner*—Mark Tsidulko
(74) *Attorney, Agent, or Firm*—Birch, Stewart, Kolasch & Birch, LLP

(57) ABSTRACT

The anticollision light for aircraft, particularly airplanes, is provided with a holding body (12) with an outer side and several LEDs (16) arranged at the outer side of the holding body (12) the light-radiating directions of which point away from the holding body (12). Further, the anticollision light is provided with a drive unit (18) for the pulse-like drive of at least some of the LEDs (16) and a refractive optical element (26) for generating a desired spatial distribution of the light of the LEDs (16), the refractive optical element (26) surrounding the holding body at least in the region of the LEDs (16).

11 Claims, 1 Drawing Sheet

ANTICOLLISION LIGHT FOR AIRCRAFT

Figure 1:
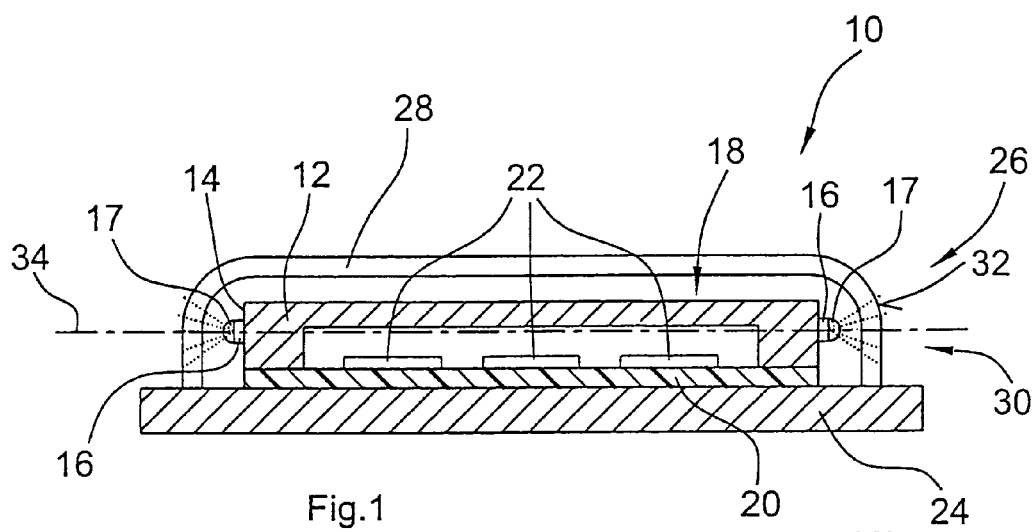

This Nonprovisional application claims priority under 35 U.S.C. § 119(e) on U.S. Provisional Application No. 60/417,661 filed on Oct. 11, 2002 and under 35 U.S.C. § 119(a) on Patent Application No. 102 46 335.2 filed in Germany on Oct. 4, 2003, the entire contents of which are hereby incorporated by reference.

The invention relates to an anticollision light for aircraft and particularly for airplanes and helicopters.

It is known to provide lights in the exterior portion of an aircraft, e.g., position lights and anticollision lights, with incandescent lamps (either with heating spiral or as electric discharge lamps). Such incandescent lamps have a relatively short life and are particularly susceptible as to vibrations.

Therefore, one goes more and more over to use light-emitting diodes (LEDs) for the outer illumination of airplanes, namely in the form of individual LEDs or LED modules comprising a semiconductor chip with a plurality of light-emitting portions. A certain disadvantage of the use of light-emitting diodes lies in their spatially limited light spreading direction (normally over solid angles of 120° to 140°), whereas incandescent lamps emit light in the entire space. In exterior lights of airplanes or aircraft equipped with incandescent lamps, this light is directed into the desired preferred direction by means of reflectors to satisfy the internationally and respectively nationally valid minimum standards with respect to intensity and light distribution. The required horizontal and vertical light intensity distribution profiles cannot image precisely enough, which means that, in order to satisfy the conditions within the one solid angle region, the outer illuminations of aircraft equipped with conventional incandescent lamps emit a light intensity much higher than the standards in the remaining solid angle regions.

Remedial action can be taken with respect thereto by the use of LEDs. The limited light radiation angle of the LEDs, however, makes problems in this respect as well.

It is the object of the invention to provide an anticollision light for aircraft, particularly airplanes, which is provided with a simplified system for the light distribution in space.

In order to solve this object, the invention suggests an anticollision light for aircraft, particularly airplanes, which is provided with
 a holding body with an outer side,
 several LEDs arranged at the outer side the light radiation directions of which point away from the holding body,
 a drive unit for the pulse-like drive of at least some of the LEDs, and
 a refractive optical element for generating a desired spatial distribution of the light of the LEDs,
 the refractive optical element surrounding the holding body at least in the region of the LEDs.

According to the invention, a refractive optical element, namely, e.g., a lens system, is hence used with the anticollision light to be described here in order to achieve the vertical light distribution required for anticollision lights. This refractive optical element surrounds a holding body holding several LEDs at least in that region in which the LEDs are arranged at the holding body. The holding body itself has an outer side on which the LEDs are located, either for emitting light all around or only in a portion of the outer surface for emitting light in a partial region. The LEDs are driven in a pulse-like manner by a drive unit. It is conceivable that not all LEDs operate during a pulsed operation. It is useful if the anticollision light is designed such that even in case of failure of a LED or a LED module, still sufficient light is emitted with respect to the horizontal light intensity distribution.

In an advantageous embodiment of the invention, it is provided that the refractive optical element is configured as a spherical or non-spherical lens or as a cylinder, free-form or Fresnel lens. Alternative configurations of the refractive optical element are, e.g., prism structures serving to direct the light like lenses.

Like every light, the anticollision light also comprises a so-called light disc separating the portion from which light emerges from the light from the environment. It is useful if the refractive optical element is simultaneously configured as a light disc so that the overall number of individual components of the anticollision light is correspondingly reduced.

In an advantageous embodiment of the invention, it is provided that the LEDs are arranged at longitudinally circumferential surfaces at the holding body and are divided up into at least two parallel planes. Alternatively, the LEDs can also be arranged in one common plane only. Within this plane or these planes, the LEDs determine the horizontal light intensity distribution that should be constant over 360° and have a minimum value.

When the LEDs are arranged in several planes, it is advantageous when the LEDs of the individual planes have different portions of the refractive optical element allocated thereto. Within these portions, the optical effect of the refractive optical element can be the same or different. The latter makes it possible to generate any (vertical) light intensity distributions by configuring these areas correspondingly. Thereby, it is possible to adapt one and the same holding body together with the plurality of LEDs to different (vertical) light intensity distributions by using differently shaped refractive optical elements.

In an advantageous embodiment of the invention, it is further provided when the refractive optical element is configured as a cap element that is put on the holding body and comprises a lid portion as well as a circumferential edge portion joined thereto which surrounds the plurality of LEDs and, if necessary, comprises the refractive optical properties up into the transition portion towards the lid portion.

As an LED, single LEDs can be used which have a semiconductor substrate with a single light-emitting portion per housing and are individually housed; alternatively or preferably, however, LED modules are used which have a semiconductor substrate with a plurality of light-emitting portions per housing, which are particularly arranged in the form of an array.

Advantageously, the outer side of the holding body is cylindrical at least in a partial area. This outer surface need not necessarily be circular cylindrical, but will preferably have a substantially circular cylindrical configuration. Alternative embodiments are, for example, an elliptic course of the cylindrical outer surface. In the scope of this invention, a "cylindrical surface" therefore means a surface that is cylindrical in the mathematical sense, i.e., spanned by a straight line when this straight line is displaced along a closed (lead) curve.

Figure 2:
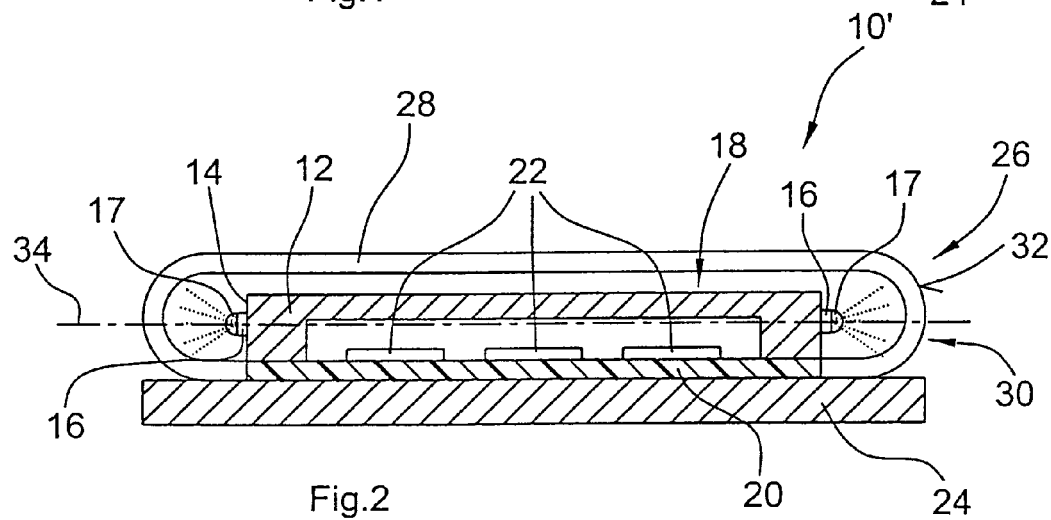
Figure 3:
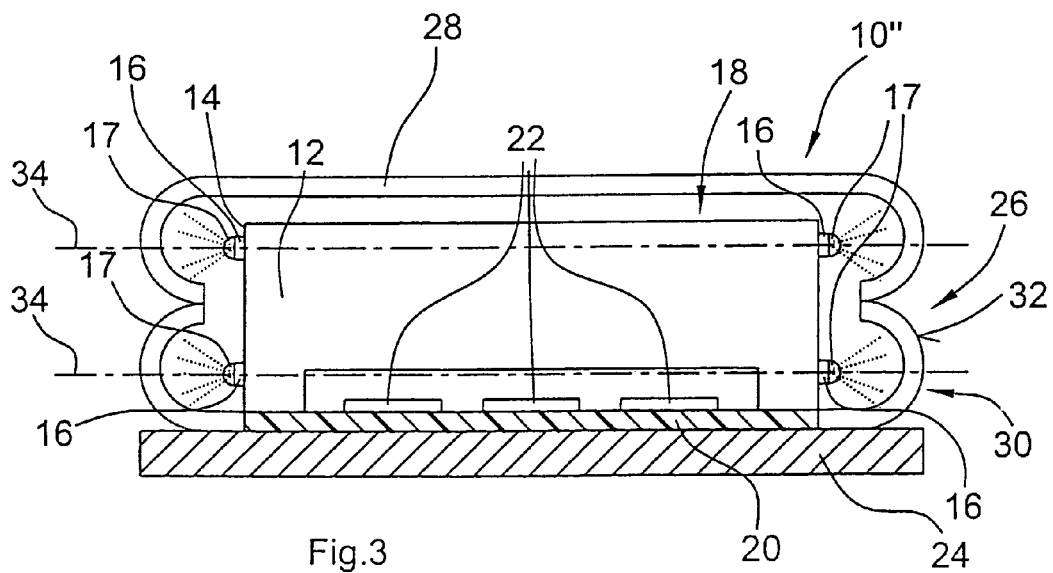

Hereinafter, the invention will be explained in detail with respect to diverse embodiments with reference to the drawing. In the Figures:

FIG. 1 shows a diagonal cross section through a first embodiment of an anticollision light for an airplane, FIG. 2 shows a diagonal cross section through a second embodiment of an anticollision light for an airplane, FIG. 3 shows a diagonal cross section through a third embodiment of an anticollision light for an airplane.

FIG. 1 shows a first embodiment 10 of an anticollision light for airplanes. The light 10 comprises a disc-shaped holding body 12 provided with a cylindrical outer surface 14. On this outer surface 14, there is a plurality of LEDs or LED modules 16 with housings acting as optical lenses 17, emitting their light in a radially outwardly directed manner. These LEDs 16 operate in pulsed operation and to this end, they are driven by a drive unit 18 with several electric and electronic circuit components 22, respectively, which are arranged on a carrier plate 20. The carrier plate 20 and the holding body 12 rest on a holding plate 24.

On the holding body 12, a refractive optical element 26 of a transparent material is put which, as a cap element, is provided with a lid portion 28 and an edge portion 30 with a substantially cylindrical outer surface 32. Within the edge portion 30 as well as, if necessary, in the transition portion to the lid portion 28, the optical element 26 has refractive properties selected such that a desired light intensity distribution appears in vertical direction, i.e., vertically to the plane 34 within which the LEDs 16 are arranged along the circumferential cylindrical outer surface 14.

FIG. 2 shows an alternative embodiment of an anticollision light 10' the individual components of which are denoted with the same reference characters in FIG. 2 as in the case of the light 10 of FIG. 1 as long as they are identical and have the same effect, respectively.

The difference of the anticollision light 10' of FIG. 2 to that of FIG. 1 lies in the configuration of the edge portion 30 of the cap-like refractive optical element 26. While the outer side of the optical element 26 is substantially cylindrical in the edge portion 30 in the embodiment according to FIG. 1, the edge portion of the cap-like optical element of the light 10' of FIG. 2 has a convexly curved outer surface 32.

In FIG. 3, a further embodiment of an anticollision light 10" is illustrated. Here, it also applies that in FIG. 3, the same reference characters are used as in FIGS. 1 and 2 as far as the elements or parts denoted in detail are identical and have the same effect, respectively.

The characteristic feature of the anticollision light 10" of FIG. 3 consists in that the light-emitting diodes 16 are arranged within two planes 34 parallel to each other. Each plane 34 of the light-emitting diodes 16 has a separate section 36,38 of the edge portion 30 of the cap-shaped optical element 26 allocated thereto. In both portions 36,38, the outer surface 32 of the edge portion 30 comprises outwardly curved sections which are possibly different in shape and in radial extension. Both convexly shaped portions 36,38, e.g., may also be identical.

The invention claimed is:

1. An anticollision light for an aircraft, comprising:
   a holding body having an outer side;
   a plurality of LEDs arranged at the outer side of the holding body, the light radiation directions of the plurality of LEDs pointing away from the holding body;
   a drive unit for providing a pulse to drive at least one of the plurality of LEDs; and
   a refractive optical element for generating a desired spatial distribution of the light of the plurality of LEDs,
   wherein the refractive optical element surrounds the holding body at least in the region of the plurality of LEDs; and
   wherein each plane defined by the plurality of LEDs or planes defined by the plurality of LEDs has a different portion of the refractive optical element allocated thereto.

2. The anticollision light according to claim 1, wherein the plurality of LEDs are arranged in a common plane.

3. The anticollision light according to claim 1, wherein the refractive optical element is a lens, a spherical or non-spherical lens, or as a cylinder, free-form or Fresnel lens.

4. The anticollision light according to claim 1, wherein the refractive optical element is a cap element covering the holding body and has a circumferential edge portion with refractive optical properties.

5. The anticollision light according to claim 1, wherein the plurality of LEDs are arranged in at least two planes that are parallel to each other.

6. The anticollision light according to claim 1, wherein the optical properties of the individual portions of the refractive optical element are different.

7. The anticollision light according to claim 1, wherein the light intensity distribution at both sides of a plane defined by the plurality of LEDs or a succession of planes defined by the plurality of LEDs is symmetrical.

8. The anticollision light according to claim 1, wherein the plurality of LEDs are provided with lenses.

9. The anticollision light according to claim 1, wherein the plurality of LEDs have individual light-emitting portions and that several of such portions are combined in one LED module, respectively.

10. The anticollision light according to claim 1, wherein the outer surface of the holding body is cylindrical.

11. The anticollision light according to claim 1, wherein the aircraft is an airplane.

* * * * *